United States Patent Office 2,901,245
Patented Aug. 25, 1959

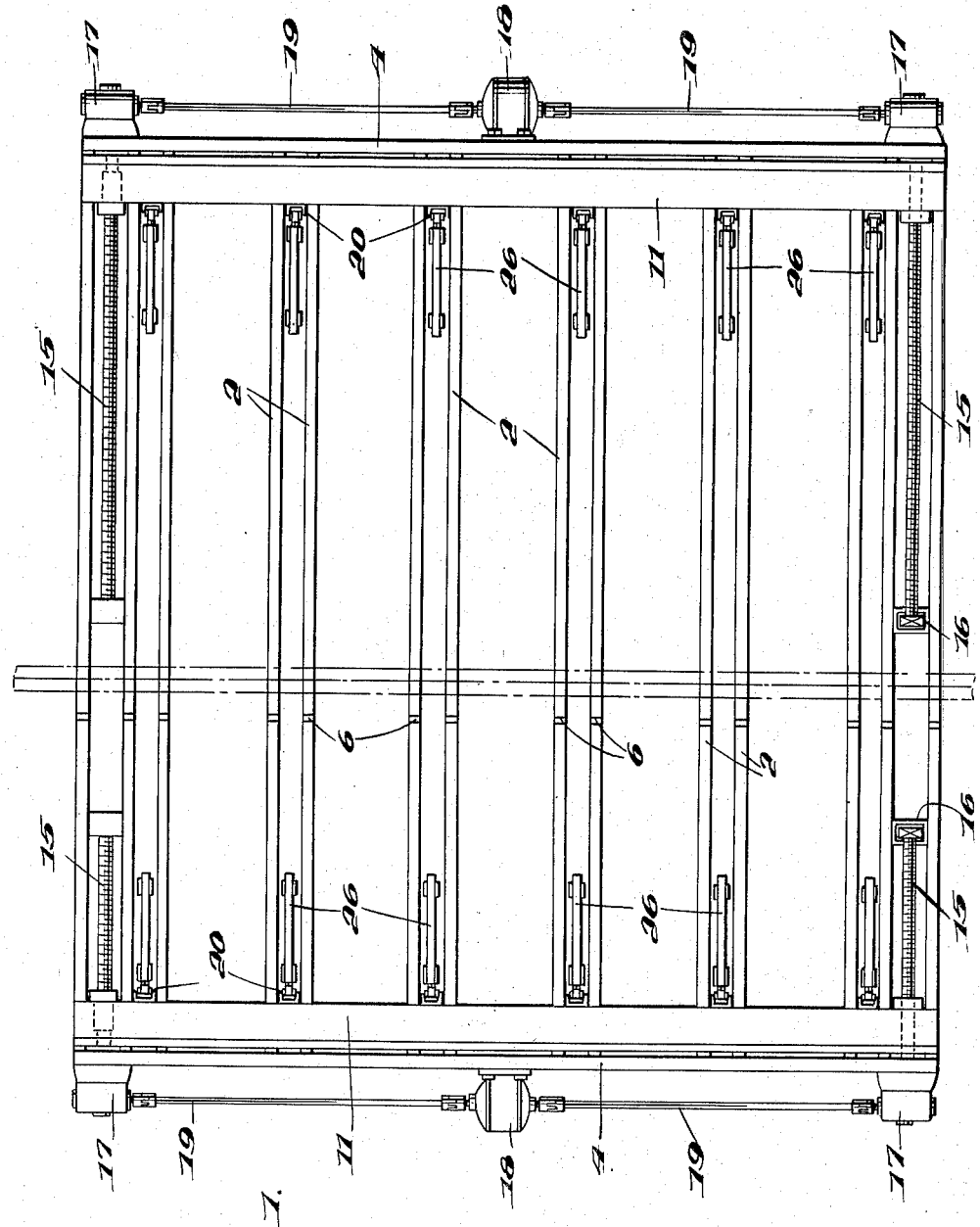

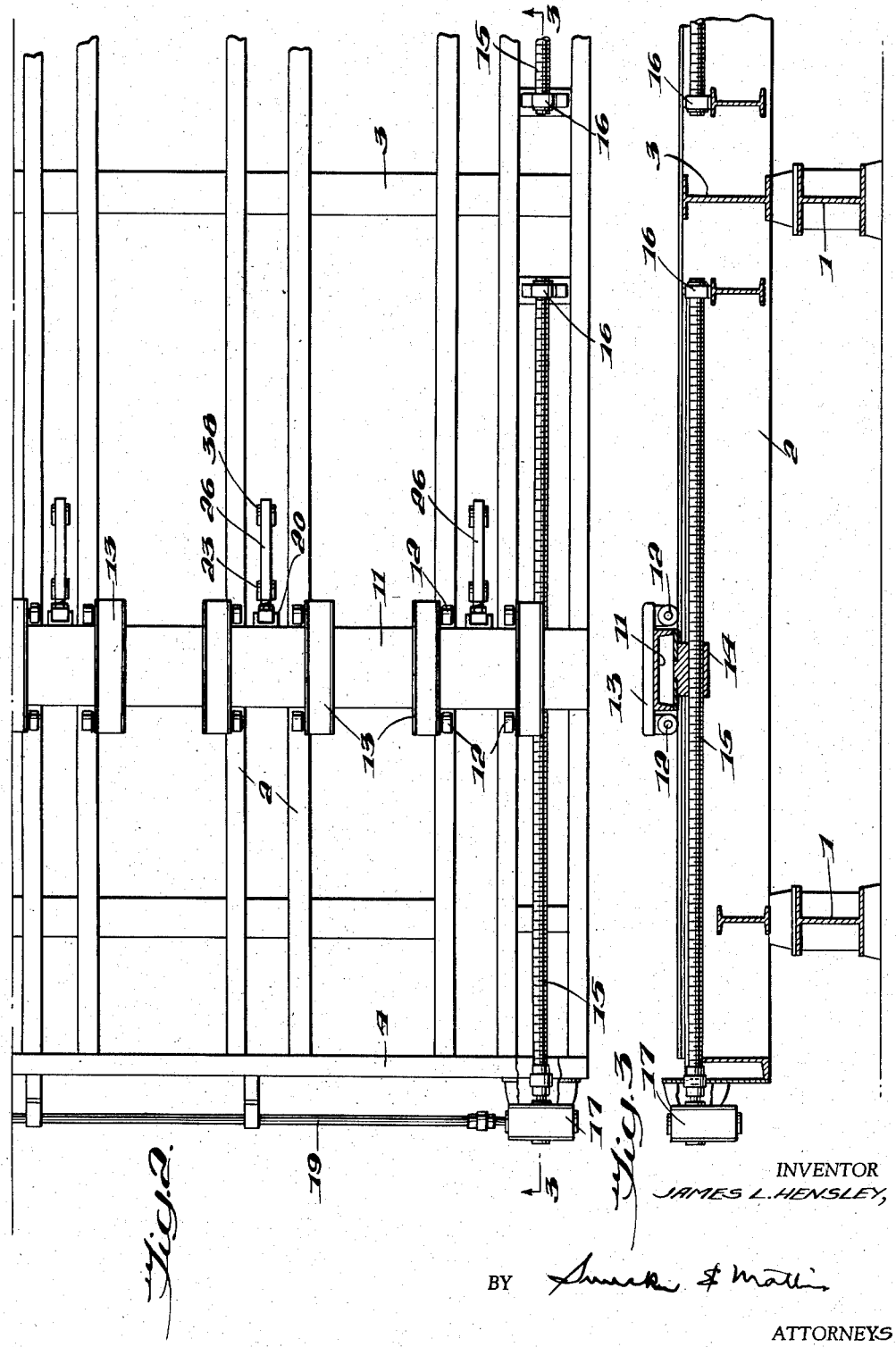

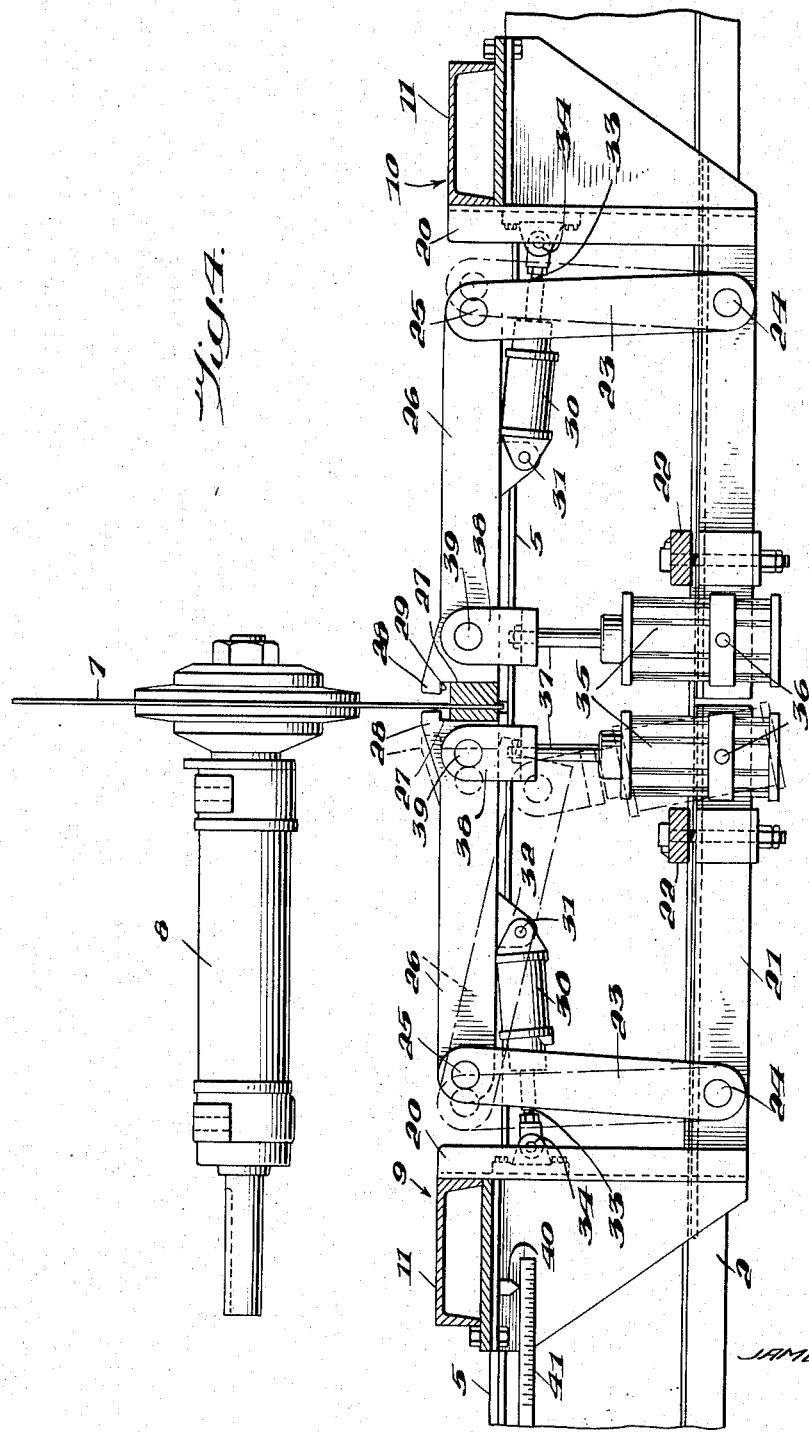

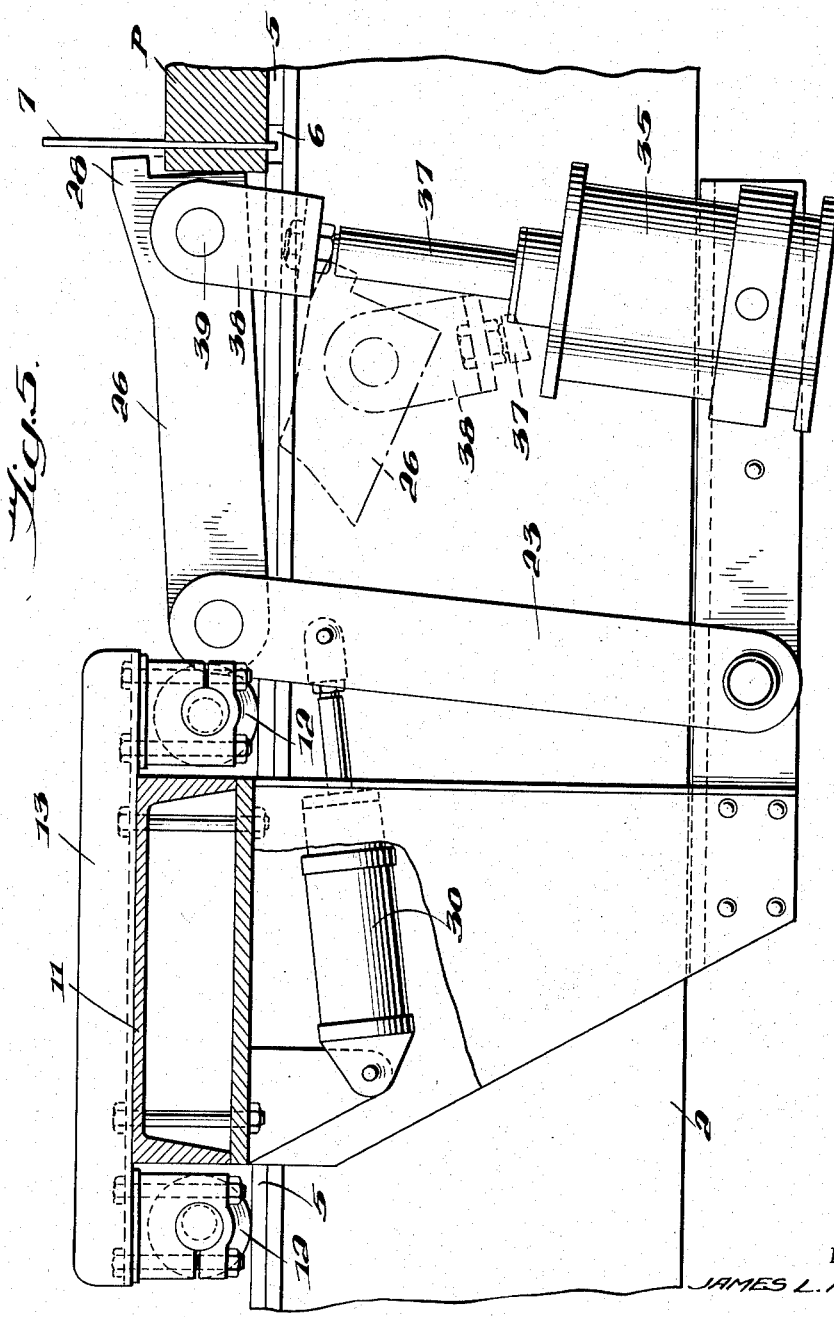

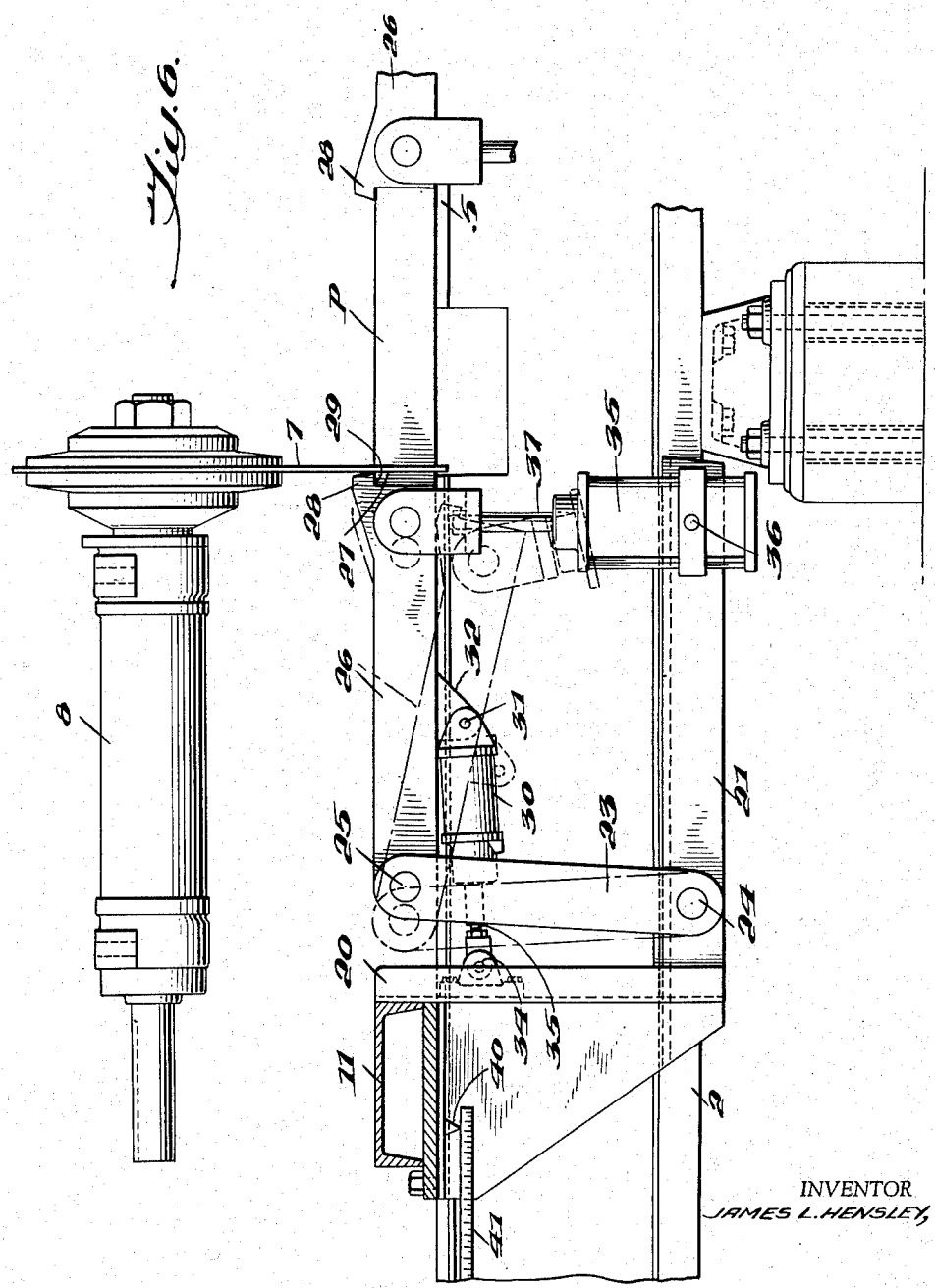

2,901,245
PLATE POSITIONING TABLES

James L. Hensley, Clinton, Tenn., assignor to Ty-Sa-Man Machine Company, Knoxville, Tenn., a corporation of Tennessee Application May 7, 1958, Serial No. 733,727

10 Claims. (Cl. 269—109)

This invention relates to improvements in plate positioning tables, and more particularly to tables which are adapted to be used for holding metal sheets during the sawing or severing thereof into separate parts.

Metal sawing tables have been proposed heretofore, but these have not been entirely satisfactory, especially for the handling of large sheets and the separation thereof into separate sections or the removal of strips therefrom.

It is often desirable to separate relatively large sheets either into respective sections or to remove relatively narrow bars therefrom, by a cutting action such as a rotary saw. Where the metal sheet is relatively thick, of the order of an inch or more for example, the holding and handling of the sheet imposes a difficult task and often makes necessary the use of several workmen to maintain the proper control and handling action of the sheet and of the parts that are separated therefrom.

One object of this invention is to improve the construction of plate positioning tables, especially such as are used for supporting metal plates or sheets to which sawing action may be applied.

Another object of the invention is to provide for the automatic operation of the plate handling action of the table, not only for clamping the plate in place on the work surface thereof, but also for removing the respective and individual parts.

Still another object of the invention is to provide, in a plate positioning table, for the automatic and power actuated clamping action that is applied to a plate or sheet on the work surface of the table during the cutting operation, as well as for removal of the cut sections therefrom without requiring the manual handling of the latter.

These objects may be accomplished, according to one embodiment of the invention, by providing gauging and feeding heads with arms that are moved into embracing relation with opposite edges of the sheet and overlapped by fingers to hold the sheet effectively and securely in place on the bed of the table. These arms are power operated, as by hydraulic or pneumatic power devices, for proper manipulation of the latter to position the sheet in correct relation to the cutting means, so as to effect an accurate severing action of the desired section of the sheet. At the same time, the arms can be manipulated so as to effect the removal automatically of a severed portion of the sheet, after which the sheet may be moved forward for another cutting action.

Provision is made for effecting the desired gauging action of the arms to move these up to just the right points for removal of the desired quantity from the sheet and thus properly control the point at which the severing action will occur.

Suitable automatic controls may be provided for properly synchronizing the holding and clamping actions, as well as the movement of the plate or sheet on the surface of the table and the removal of the severed section therefrom.

This embodiment of the invention is illustrated in the accompanying drawings, in which:

Fig. 1 is a top plan view of a plate positioning table to which the invention is applied;

Fig. 2 is a similar view of a portion of the table, with the parts adjusted to a different position;

Fig. 3 is a cross section therethrough, substantially on the line 3—3 in Fig. 2;

Fig. 4 is a detail cross section through the gauging and feeding head assemblies;

Fig. 5 is a similar view through a gauge assembly of somewhat modified form; and Fig. 6 is a similar view, showing still another modification.

The table which is illustrated as one embodiment of this invention is of the character which will receive and hold relatively large sheets or plates of thick metal stock while each sheet is being severed into separate sections or bars. Thus, the table is constructed relatively sturdy and heavy, because of the requirement that it sustain substantial weight and hold the sheet or plate securely in place thereon during the sawing operation.

Accordingly, the table rests on a plurality of sills, generally indicated at 1, or other suitable means which will support the working surface of the table at the desired elevation. Each of the sills 1 is shown as extending throughout the width of the table and spaced apart lengthwise thereof a sufficient distance to afford sturdy and rigid support therefor.

Extending lengthwise of the table are a plurality of pairs of track members 2 which extend continuously from end-to-end of the table, in the example illustrated, although these track members 2 may terminate, if desired, at a center bar, indicated at 3, which, in the illustrated embodiment, extends between the pairs of track members. At their opposite ends, the track members 2 are secured to end frame member 4 extending transversely of the table. Any suitable or desired number of pairs of track members may be used as found to be needed, according to the size of sheets or plates to be handled thereon and the rigidity or flexibility thereof. I have illustrated six pairs of track members, with a corresponding number of holding arms, although I realize that the number of each may be varied if found desirable.

Extending along the upper surface of each of the track members 2 is a wear strip 5 which is substantially of the same width as the upper surface of the track member. These wear strips are relatively thick and support the sheet or plate on the upper surface thereof. The wear strips 5 are shown with grooves 6 therein at the point of the sawing or severing action to receive the projecting edge of the saw or other cutter.

A conventional saw is illustrated at 7 in Figs. 4 to 6, mounted on an arbor, generally indicated at 8, suspended in suitable manner over the table. This saw is illustrated merely as one embodiment of severing means that may be used for cutting the plate or sheet into the desired sections. Apparatus for automatic sawing action for such plates or sheets is well known in the art and need not be described in detail.

Mounted on the track members 2 and extending transversely thereof, according to one embodiment of the invention, are gauging and holding assemblies, generally indicated at 9 and 10 in Fig. 4. These assemblies are adapted for movement, respectively, from the center line or the plane of the saw blade 7 to the adjacent end of the table. If the saw blade operates in a plane midway of the length of the table, each of the gauging and holding assemblies would be movable substantially throughout one-half of the length thereof, but it is sometimes desirable that the plane of the cutting action be located closer to one end of the table than to the other, in which event the gauging assembly may be mounted for movement through less than half of the length, while the feeding assembly would have a greater path of travel.

Each of the gauging and feeding assemblies 9 and 10 includes a cross head 11 which extends transversely over the series of pairs of track members 2. Each cross head 11 is supported on each track member 2 by rollers 12 journaled in a suitable bracket structure 13 on the cross head and riding upon the adjacent track member 2, over the wear strip 5 thereon. The cross head 11 extending throughout the width of the table thus may be rolled lengthwise of the track members for effecting the desired gauging or feeding actions as hereinafter described.

At each end of each cross head 11 and rigidly secured thereto there is provided a feeding member, shown in the form of an internally threaded nut 14, which received therethrough an externally threaded screw 15. The screws 15 are located at the opposite sides of each end of the table and extend from the ends inwardly toward the plane of the saw. The screws 15 are journaled in suitable bearings provided in the end frame members 4 and have their inner ends mounted in bearings 16 adjacent, but spaced from, the plane of operation of the saw.

The screws at each end of the table are operated in unison, as, for example, through speed reducer gearing 17 which, in turn, is connected with a drive motor 18 through suitable drive shafts 19. These parts are shown as mounted on each end frame member 4 of the table.

Each assembly 9 and 10 has a clamp structure carried thereby, adapted for automatic operation, according to the embodiment illustrated in Fig. 4. Each such clamp includes a frame structure having an upright channel 20 depending from one edge of the cross head 11 and a longitudinal support member 21 extending forwardly therefrom. The support member 21 may be provided, if desired, with a shoe 22 which rides upon the lower flanges of the pair of track members 2 between which this supporting structure is mounted. A clamp is provided preferably between the track members on each pair, according to the illustrated embodiment, or a suitable number of clamps may be provided according to the character of the plate or sheet to be handled on the table.

Upstanding from the support member 21 are links 23 pivoted at 24 to the support member 21, and the upper ends of the links 23 are, in turn, pivoted at 25 to one end of an arm 26, which arm 26 is mounted between the track members 2 and is capable of being raised and lowered with respect thereto.

The opposite end of the arm 26 has an abutting face 27 in position to engage against the lateral edge of the plate P and with a projecting overhanging finger 28 in position to overlie the edge of the plate P. The shoulder 29 provided at the bottom face of the finger 28 is in clamping relation with the upper face of the plate when the plate is clamped on the table.

The arms 26 are moved rectilinearly by fluid power devices 30 pivotally connected at 31 at one end of the cylinder to a bracket 32 on the arm 26. The piston in the cylinder is connected to a rod 33 which is adjustable in length and has a pivotal connection 34 with the channel 20 of the head assembly.

Each arm 26 is also capable of being raised and lowered with respect to the plate P. A cylinder 35 is pivotally mounted at 36 on the head assembly, such as on the support bar 21, for raising and lowering the arm 26. A rod 37 extends from the piston in the cylinder 35 to a saddle clamp 38 which has a pivotal connection 39 with the free end portion of the arm 26. Upon raising and lowering movements of the piston rod 37, the free end of the arm 26 connected therewith also may be raised and lowered with respect to the plate P normally clamped thereby.

The cylinders 30 and 35 may be either pneumatic or hydraulic cylinders, as desired, or other suitable form of power devices may be substituted therefor. Such cylinders are controlled from the control panel of the machine through suitable relays or other control means manipulated by the operator. The same control panel may include means for controlling the operation of the motors 18 at the opposite ends of the machine to provide the required feeding action of the clamping units with respect to the plate or sheet P.

The gauging head 11 is provided with a pointer 40 (Figs. 1 and 4) in registry with a gauge bar 41 mounted on a side of the machine frame, so as to indicate thereon the seating of the gauging head according to the section of the plate that is to be removed. Thus, for example, the gauging head may be set to cut off ¾ inch from the edge of the plate P, and the clamp arms 26 connected with the gauging head will be in the proper position to limit the movement of the plate P with respect to the saw 7 so as to remove just that quantity from the plate.

In operation, it has been explained above that the machine is under the control of an operator located at one central point who can control all of the functions of the machine. He can move the clamping heads forward and backward independently and relative to each other by the operation of the motors 18 and the feed screws 15, as well as to control the clamping action of the arms 26 with respect to the plate or sheet P.

With the gauging and feeding heads withdrawn to a suitable or desired extent, a plate is laid on the wear strips 5 of the track members 2. This may be done either by hand or by an overhead hoist, as found convenient. The motor 18 is then operated to turn the feed screws 15 connected with the gauging head 11 so as to move the latter to the proper position according to the pointer 40 on the gauge bar 41 to cut off or remove just the required amount from the plate P. The fingers 28 will be raised during the initial setting of the machine, as shown in full lines in the drawings.

The feeding head 10 is then operated in like manner by the motor 18 and the feed screws 15 connected therewith to move the plate P up to and against the faces 27 of the gauging arms 26. This is done by the pushing action of the feeding arms 26 against the edge of the plate, as will be apparent from Fig. 4. With the plate thus properly positioned on the machine and held between the opposed faces 27 of the respective gauging and feeding arms 26, this plate may then be clamped in place at its opposite edges by the actuation of the power devices 35 to pull downward on the free ends of the arms 26 against the upper face of the plate P, as indicated by the dotted lines immediately above the edges of the plate.

The plate is thus clamped in place on the table and is held securely during the sawing or cutting operation. In the example illustrated, the saw 7 is operated in a conventional manner by movement across the table to sever the desired quantity from the edge of the plate. In the example illustrated above, this will remove a strip ¾ inch wide, although it will be appreciated that any desired quantity may be separated therefrom.

After thus severing the plate, the power devices 35 are manipulated again to lift the free ends of the arms 26 to the full line position shown in the drawings. Then, the power devices 30 are operated to retract the arms 26 to the upper dotted line position shown. This will clear the fingers 28 from the edge of the plate and allow the power devices 35 connected with the feeding arms to be operated so as to pull down the free ends of the arms, as indicated by the lower dotted line position shown in Fig. 4. This will locate the free ends of the gauging arms 26 below the plane of the wear strip 5. Then, the feeding screws connected with the feeding head 10 can be operated, if desired, to push the removed strip or section over the upper edges of the gauging arms 26 where it may be shifted laterally of the table and removed therefrom in any suitable or desired manner. Thereafter, the arms can be raised again in position for a second adjustment of the plate P to remove additional strips or sections therefrom in the manner described.

The table is effective to hold the plate in place during the cutting operation and produces an accurate severing of the desired quantity from the plate, all by the use of one man only to operate the controls. At the same time, it effects the cutting action with greater speed and more accuracy than could be done heretofore on cutting tables that required the operation of several men.

While the invention has been illustrated and described in one embodiment, it is recognized that variations and changes may be made therein without departing from the invention as set forth in the claims.

I claim:

1. A plate positioning table including means forming supporting surfaces adapted to receive a plate thereon for severing into respective sections, plate clamping means in position for receiving and holding opposite edge portions of said plate, and means mounting one of the clamping means for movement to a position below said surface to permit a severed section of the plate to be moved over the surface above said clamping means.

2. A plate positioning table including means forming supporting surfaces adapted to receive a plate thereon for severing into respective sections, plate clamping means in position for receiving and holding opposite edge portions of said plate, one of said clamping means including a plurality of clamping members, and means mounting said clamping members for raising and lowering movements with respect to the surface to permit the severed portion of the plate to be moved over the surface above said members after lowering thereof.

3. A plate positioning table including means forming supporting surfaces adapted to receive a plate thereon for severing into respective sections, plate clamping means in position for receiving and holding opposite edge portions of said plate, one of said clamping means including a plurality of clamping members mounted for raising and lowering movements with respect to the surface to permit the severed portion of the plate to be moved over the surface above said members after lowering thereof, and power means operatively connected with said members for raising and lowering the latter with respect to the surface.

4. A plate positioning table including means forming supporting surfaces adapted to receive a plate thereon for severing into respective sections, plate clamping means in position for receiving and holding opposite edge portions of said plate, one of said clamping means including a head structure, means mounting the head structure for bodily movement toward and from the other clamping means, a plurality of clamping members pivotally mounted on the head structure for raising and lowering movements with respect to the surface, power means connected with the members for lowering said members below the surface for shifting movement of the severed section of the plate along the surface over said lowered members.

5. A plate positioning table including means forming supporting surfaces adapted to receive a plate thereon for severing into respective sections, plate clamping means in position for receiving and holding opposite edge portions of said plate, one of said clamping means including a cross head extending transversely of the supporting surface, a plurality of arms extending laterally from the cross head substantially parallel with the supporting surface, means pivotally mounting each of the arms for raising and lowering movements above and below the supporting surface, and power means connected with the arms for raising and lowering the latter.

6. A plate positioning table including means forming supporting surfaces adapted to receive a plate thereon for severing into respective sections, plate clamping means in position for receiving and holding opposite edge portions of said plate, one of said clamping means including a cross head extending transversely of the supporting surface, a plurality of arms extending laterally from the cross head substantially parallel with the supporting surface, means pivotally mounting each of the arms for raising and lowering movements above and below the supporting surface, power means connected with the arms for raising and lowering the latter, and means moving each of the arms lengthwise of the arms and transversely relative to the cross head to vary the clamping action of the arms on the plate.

7. A plate positioning table including means forming supporting surfaces adapted to receive a plate thereon for severing into respective sections, plate clamping means in position for receiving and holding opposite edge portions of said plate, one of the clamping means including a plurality of arms extending substantially parallel with the surface, each of the arms having an end face thereon against which the edge of the plate is adapted to abut, and with a finger at the upper edge of the said end face in position to overlap the edge of the plate, power means for moving the arms lengthwise of the surface to position a plate thereon, and separate power means for raising and lowering the clamping fingers to clamp the plate in place.

8. A plate positioning table including means forming supporting surfaces adapted to receive a plate thereon for severing into respective sections, plate clamping means in position for receiving and holding opposite edge portions of said plate, one of the clamping means including a plurality of arms extending substantially parallel with the surface, each of the arms having an end face thereon against which the edge of the plate is adapted to abut, with a finger at the upper edge of the said end face in position to overlap the edge of the plate, means for raising and lowering said last-mentioned end of each arm, and means for moving each arm lengthwise to vary the position of abutting action thereof relative to the plate.

9. A plate positioning table comprising a plurality of track members having supporting surfaces thereon adapted to receive a plate for severing of the sections, cross heads extending transversely of the track members and spaced apart lengthwise thereof, means mounting the cross heads on the track members for movement toward and from each other, power means operatively connected with the cross heads for moving the latter, and means connected with the cross heads for clamping engagement with opposite edge portions of a plate mounted on the track members.

10. A plate positioning table comprising a plurality of track members having supporting surfaces thereon adapted to receive a plate for severing of the sections, cross heads extending transversely of the track members and spaced apart lengthwise thereof, means mounting the cross heads on the track members for movement toward and from each other, power means operatively connected with the cross heads for moving the latter, and arms connected with the cross heads and extending inwardly toward each other for clamping engagement with opposite edge portions of the plate supported on the track members.

References Cited in the file of this patent

UNITED STATES PATENTS

| | | |
|---|---|---|
| 2,767,458 | Meier | Oct. 23, 1956 |
| 2,772,528 | Else | Dec. 4, 1956 |